SYNCHRONIZATION OF PULSE TRANSMISSION SYSTEMS

Filed May 20, 1960 5 Sheets-Sheet 1

INVENTOR
R. L. CARBREY
BY R. B. Ardis
ATTORNEY

Nov. 5, 1963 R. L. CARBREY 3,109,897

SYNCHRONIZATION OF PULSE TRANSMISSION SYSTEMS

Filed May 20, 1960 5 Sheets-Sheet 2

INVENTOR
R. L. CARBREY
BY R. B. Ardis
ATTORNEY

INVENTOR
R. L. CARBREY
BY R. B. Ardis
ATTORNEY

Nov. 5, 1963 R. L. CARBREY 3,109,897
SYNCHRONIZATION OF PULSE TRANSMISSION SYSTEMS
Filed May 20, 1960 5 Sheets-Sheet 4
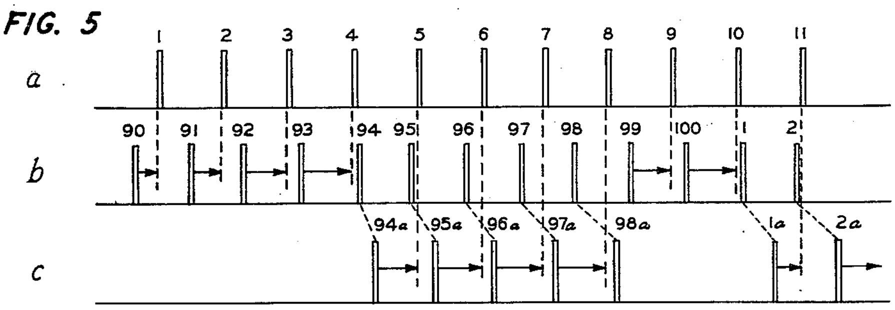
FIG. 6
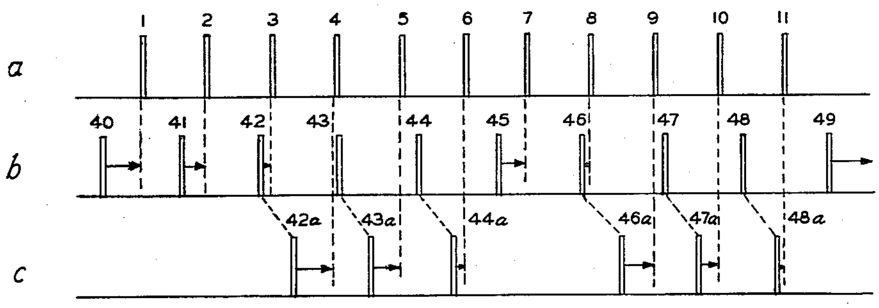
FIG. 8
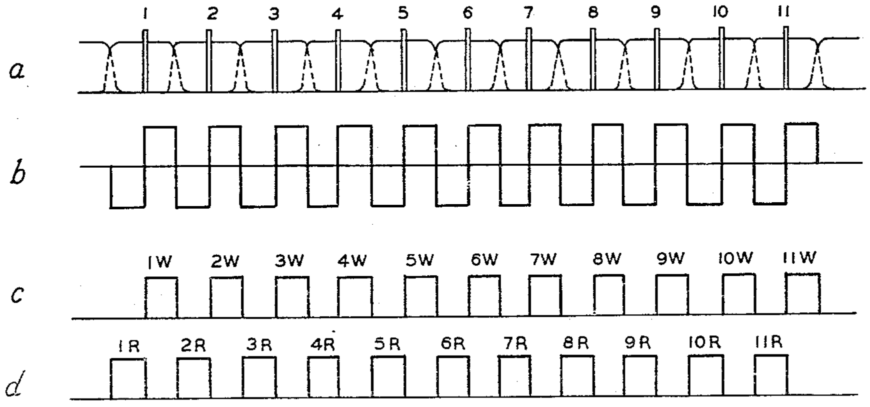
INVENTOR
R. L. CARBREY
BY R. B. Anders
ATTORNEY Nov. 5, 1963 R. L. CARBREY 3,109,897

SYNCHRONIZATION OF PULSE TRANSMISSION SYSTEMS

Filed May 20, 1960 5 Sheets-Sheet 5

INVENTOR
R. L. CARBREY
BY R. B. Ardis
ATTORNEY

United States Patent Office 3,109,897
Patented Nov. 5, 1963

3,109,897
SYNCHRONIZATION OF PULSE TRANSMISSION SYSTEMS

Robert L. Carbrey, Madison, N.J., assignor to Bell Telephone Laboratories, Incorporated, New York, N.Y., a corporation of New York
Filed May 20, 1960, Ser. No. 30,633
18 Claims. (Cl. 179—15)

This invention relates to pulse communication systems, and more particularly concerns apparatus for synchronizing signals at selected points of a transmission network.

In time division multiplex (TDM) communication systems, as is familiar to those skilled in the art, a plurality of message vehicles, speech waves for example, are sequentially sampled, and coded digits representative of those samples are serially applied to a transmission medium. At predetermined points along the medium, facilities are provided for selecting and decoding particular ones of the digits in order to remotely reconstruct messages represented by the selected digits. At each transmitting facility there is generally an associated local receiving facility, the pair commonly known as a multiplex terminal, so that complete bidirectional communication is provided throughout the system. At a receiving facility coded digits arrive in sequence, and those to be selected as constituent of a desired message, are identified by their times of arrival, or time slots, with respect to the multiplex frame in which they are included. One example of a system operative in accordance with the foregoing principles is described in an article coauthored by E. Peterson and L. A. Meacham entitled "An Experimental Multichannel Pulse Code Modulation System of Toll Quality" appearing in the Bell System Technical Journal for January 1948 at page 1.

It is desirable, if not essential, that large TDM systems contain many nodal points at which any number of bidirectional independent transmission media converge. These nodes take the forms of either particular multiplex terminals to which several remote terminals are interconnected over separate routes, or switching centers in which digits are transferred from route to route under the control of signaling apparatus. Both foregoing arrangements present formidable difficulties to digit identification. In regard to the former, consider two distant multiplex terminals being connected to a third over independent lines. Digits arriving at the third terminal via the two incoming lines will generally not be in synchronism, nor will the time slots of digits arriving on one line correspond to the time slots of digits arriving on the other line. In order to selectively sense digits from either of the asynchronously energized lines so as to individually connect the subsets of a plurality of subscribers at distant terminals with a corresponding plurality of subscribers at the third terminal, it has previously been found necessary to employ separate distributing and synchronizing apparatus for each converging line. Thus, if there are 72 subscriber channels per converging line, a 72 channel distributor is provided for each line. Such an approach is necessarily burdensome in terms of cost, maintenance and space.

Switching centers present difficulties to digit identification which, in certain respects, are even greater than those presented by terminals. Due to factors such as varying climatic conditions which give rise to changes in transmission characteristics of a network, digits arriving at a center on converging lines from distant locations are neither in synchronism nor in time slot correspondence. Thus, attempts to effect rerouting by directly inserting digits, as they arrive on one line, into either corresponding or selected non-corresponding time slots of any of the other lines results in a confused displacement of the rerouted digits from the time slots into which they are scheduled to be transferred. In the prior art, one arrangement adapted to insure selective digit transfer requires that messages on all lines be reconstructed by apparatus located at the center, and selected messages assigned to a particular outgoing line be resampled, reencoded, and retransmitted by separate facilities associated with that particular line. Such an arrangement, commonly known as an audio switching center, while adequate to perform its intended function, has the serious disadvantage of providing messages with additional distortion by virtue of the attendant decoding and subsequent reencoding processes. A second digit rerouting proposal is advanced in U.S. Patent 2,861,128, granted to Sidney Metzger on November 18, 1958, and suggests an arrangement for aligning, at a switching center, corresponding digits propagating on intersecting transmission lines. As presented, however, embodiments of Metzger's disclosure do not appear adaptable to systems requiring complete flexibility of intercommunication paths, that is to say, a system in which several switching centers are located between a single pair of terminals. Furthermore, for proper alignment to be accomplished by Metzger's apparatus, all terminals must be synchronized to a single reference timing generator. The fulfillment of this condition presents problems as difficult as the one to which solution is sought.

Accordingly, it is one object of this invention to reduce terminal apparatus in a complex time division multiplex communication system.

It is another object of this invention to facilitate the interconnection of a plurality of terminals in a time division multiplex system with any particular terminal over individual routes.

It is a further object of this invention to reduce the complexity of switching circuitry heretofore required by a system featuring complete interchange of information between intersecting transmission media at any number of switching centers.

It is yet another object of this invention to improve synchronization in geographically wide-spread time division multiplex systems, the communication links of which experience variations in transfer characteristics due, for example, to varying climatic conditions.

The foregoing and other objects of the invention are accomplished, broadly, by means disposed at a nodal point of a TDM communication system for aligning, in a predetermined order, signals on each convergent medium with signals on one of the convergent media. More specifically, storage apparatus is included at a nodal point adapted to locally align in a predetermined order digits propagating in each convergent medium in accordance with digits propagating in a predetermined one of the convergent media. In one particular adaptation of the invention, the order of aligned digits on each converging medium is the same, that is to say, time slots of digits on any medium correspond at each instant of time to time slots on each of the other media. In a more general arrangement, however, the orders of digits on converging media do not directly correspond, but rather, are in a non-sequential predetermined relationship to each other.

As one of its features the invention includes a plurality of circuits, hereinafter referred to as minor memory circuits, for sampling digits as they arrive at a node in parallel from via individual transmission media, and transferring these samples in alignment with common reference pulses to subsequent storage devices. Apparatus is also provided in the minor memory for either inserting a spurious sample, or deleting a sample, respectively, in the event that either too few or too many digits arrive at the sampling point on any of the media with respect to pulses on the reference line. In one illustrative configuration embodying this feature, separate storage elements situated at a node are severally connected through individual switching circuits to each converging line except one, which line is designated a reference. Associated with each storage element is phase, or coincidence, detecting apparatus for producing signals severally indicative of the time separation between pulses on the reference line and samples arriving to be transferred to individual storage elements. Digits on each line are sampled in order of arrival, and the samples are inserted, or written-in, to the storage element with which the line is associated. The stored samples are sensed, or read-out, in accordance with reference pulses. In a situation in which each digit arrives at a minor memory circuit and its sample written-in to the storage element before the arrival of its associated read-out (reference) pulse, that is to say, samples and reference pulses alternate, each sample may be aligned with a successive reference pulse without the necessity of adding or deleting samples.

The individual switching circuits associated with each storage element function both to transfer samples from a transmission line to its associated storage element, and to effect sample addition or deletion. A switching circuit, in one illustrative embodiment, comprises a pair of mutually exclusive conductors connected to the line, one of the conductors including a delay device, and a selector for enabling a selected one of the conductors to exclusively transfer samples to the storage element. Each selector is operative in response to signals from its associated coincidence detecting apparatus. As will subsequently be explained in full detail, the coincidence detecting apparatus is adapted to sense substantial coincidence between digits arriving at a predetermined point of the reference line and those arriving at the switching circuit, and responsively emit a signal for reversing the selector. By reversing the selector immediately after a digit has been sampled to enable the conductor including the delay device to transfer samples to the storage element, a spurious (duplicate in this arrangement) sample is added to those read out of the storage element. On the other hand, by reversing the selector immediately after a digit has been sampled to enable the conductor not including the delay device to transfer samples to the storage element, a sample is deleted from those read out of the storage element.

As another of its features, the invention includes apparatus, hereinafter referred to as a major memory, for storing samples obtained from a minor memory and nondestructively sensing, or reading out, digits representative of those stored samples synchronously and in a predetermined order with respect to digits propagating on a reference medium. In a preferred embodiment, storage apparatus utilized in a major memory circuit comprises a cathode-ray type storage tube having its electron beam positioned by two sets of counters, one for a read-out and the other for a write-in operation. Samples obtained from a minor memory are stored, or written-in, the major memory storage device at addresses corresponding to the time slots of the digits which they represent. In the event a sample is either duplicated or deleted by a minor memory, a signal denoting this occurrence is received by the write-in operation beam positioning counters which cause either two successive samples to be stored at an address in the event of the former, or no sample to be stored at an address in the event of the latter. Digits representing stored samples are read-out in a sequence controlled by the read operation beam positioning counters and at a rate determined by signals on the reference medium. The read-out operation counters are programmed to allow the electron beam, during the read-out operation, to scan stored samples in a desired order with respect to the digits arriving on the reference medium. Although in the preferred embodiment of the major memory circuit the rearrangement of digits is accomplished by orderly storage followed by programmed read-out, it is apparent to one skilled in the art that a similar result is achieved by a converse arrangement in which samples are stored in programmed fashion and read-out by an orderly scan of the storage medium.

The major memory, under particular conditions, will either repeat or delete a multiplex frame of digits. If, for example, digits arrive via a reference medium before samples to be read-out in response to those digits are stored, samples of the previous multiplex frame stored in the major memory are repeated. If, on the other hand, digits arrive on a reference medium one full multiplex frame after samples to be read-out in response to those digits are stored, assuming the storage tube to have a capacity of one multiplex frame, the digits of one multiplex frame will be deleted. The distortion introduced into transmitted messages by the occasional deletion or duplication of either a digit sample by the minor memory, or, even less frequently, a full multiplex frame by the major memory, is generally imperceptible by a subscriber.

To aid in a more thorough understanding of the foregoing objects and features of the invention the following detailed specification is presented in conjunction with several drawings of which:

FIGS. 5 and 6 illustrate series of waveforms which aid in understanding how the minor memory circuit effects sample duplication and deletion, respectively;

FIG. 8 shows a series of waveforms useful in describing the operation of a major memory circuit.

Figure 1:
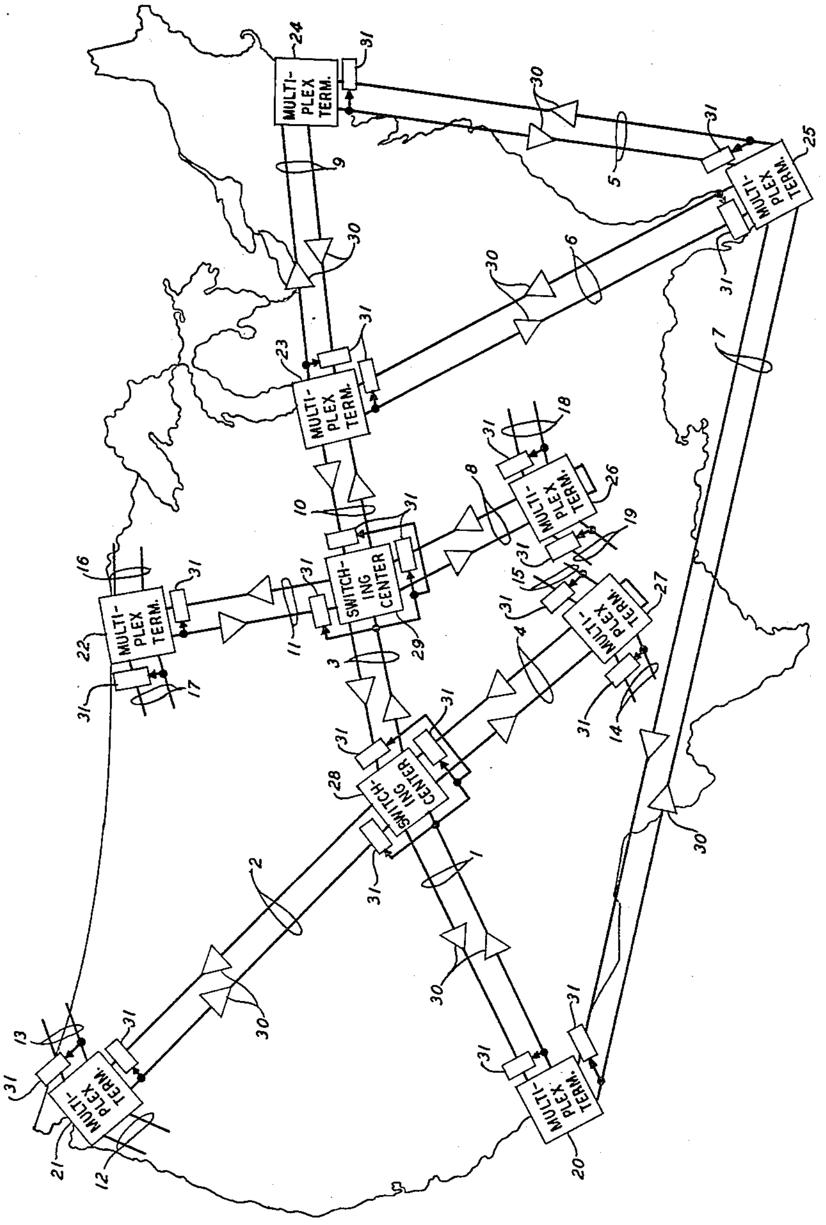
FIG. 1 illustrates a transcontinental multiplex communication system of the type in which the present invention finds considerable utility.

With reference to FIG. 1, a TDM communication system is depicted which may, for example, be of the pulse code modulation variety described in the aforementioned article by Meacham and Peterson. Included in the system are a number of independent bidirectional transmission media 1 through 19 which converge in groups at nodal points 20 through 29. Two different types of nodal points are shown, 20 through 27 representing multiplex terminals operative to both transmit and receive messages in multiplex form, while 28 and 29 represent switching centers which selectively reroute digits from any incoming to any outgoing line. Since the system illustrated is of extensive geographic proportions, its various terminals are subjected to diverse ambient temperatures, and its transmission media subjected, along their length, to changing climatic conditions which correspondingly vary their transmission characteristics. Situated at discrete intervals along the media are regenerative repeaters 30 which reshape and retransmit digits as they arrive. While for convenience the system of FIG. 1 is illustrated as being of the type wherein information is transferred via transmission lines, it is to be understood that the principles of the invention are equally applicable to microwave systems in which radio frequency waves modulated by digital information are transmitted through space.

At each node, a memory unit 31 is situated in each of the incoming lines except one. The lines in which no memory unit is connected are denoted reference lines. The units 31, each comprising a minor and a major memory circuit, function to align digits arriving at a node via the incoming lines with those arriving via the reference line.

Figure 2:
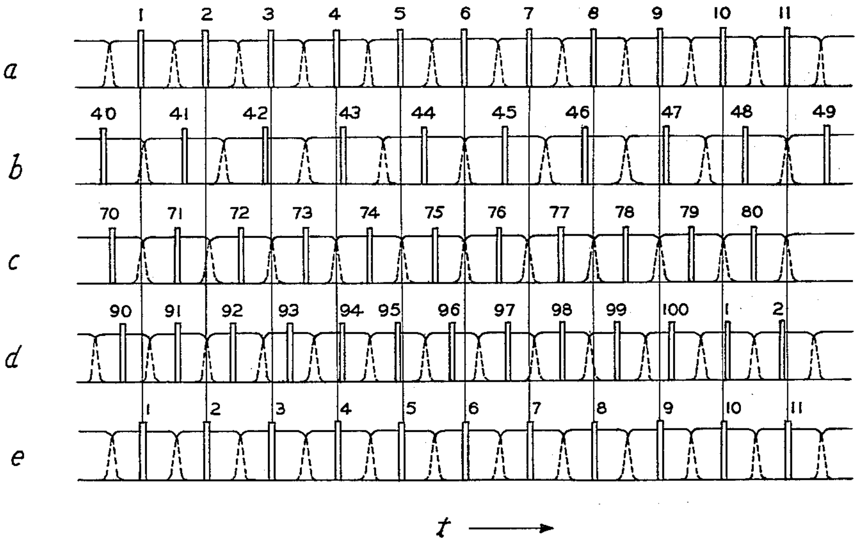
FIG. 2 depicts a series of waveforms illustrating the alignment of digits at a nodal point in corresponding order.

The alignment of digits at a node is illustrated by FIG. 2 in which waveforms *a* through *e* represent trains of digits having relatively narrow sampling gate pulses superimposed in the center of each digit. The number associated with each digit shown in the figure represents its time slot in the multiplex frame in which it is included. Assume waveforms *a* through *d* to represent digits arriving at switching center 28 of FIG. 1 via the incoming lines of media 1 through 4, respectively, the digits on line 1 being denoted a reference. Waveform *e*, on the other hand, depicts aligned digits leaving the center on each of the outgoing lines of media 1 through 4 in corresponding order with each other. While for convenience of illustration all digits are shown as pulses, in actuality they consist of both pulses and spaces. Digits arriving at switching center 28 on the incoming lines are normally neither synchronized, nor in time slot correspondence with each other. It is readily observable that in comparison to the reference waveform *a*, the digits of waveform *b* occur at a slower rate, those of waveform *d* occur at a faster rate, and those of waveform *c*, while occurring substantially at the same rate, are leading by approximately one-half period. In addition, the time slots of the digits appearing at the switching center on the incoming lines of media 2, 3 and 4, do not correspond to the time slots of the reference digits. In accordance with the principles of the invention, memory units 31 align, in a predetermined order, digits on each converging line with digits on the reference line. This is illustrated in FIG. 2 by waveform *e* which depicts the order of digits leaving switching center 28 via each of the outgoing lines as corresponding to each other, that is to say, identical. It is to be understood, however, that waveform *e* characterizes only one particular type of alignment contemplated by the invention, it being understood the memory units 31 are adaptable to align digits on different lines in any predetermined order with respect to each other.

While the waveforms of FIG. 2 are described to illustrate the operation of memory units upon digits arriving at a switching center, it is apparent that by similarly arranging memory units at a multiplex terminal alignment results between digits arriving on a plurality of lines at that terminal. For example, the waveforms *a* through *d* may represent digits arriving at a multiplex terminal via several incoming lines. If memory units 31 having properly programmed read-out counters are connected in all incoming lines except one, which line is the reference, digits transferred to the terminal via each incoming line will be in synchronism and time slot correspondence with digits arriving on each other line. Accordingly, common distributing apparatus is permitted to be utilized by all of the incoming lines. Furthermore, if, by any of a number of well-known techniques, transmitted digits are made to correspond with incoming digits, bidirectional digit transfer apparatus common to both incoming and outgoing lines may be employed to further simplify terminal equipment. One example of bidirectional gating circuitry operative to transfer signals in opposite directions during a single time slot is described in copendng application Serial No. 633,358, by W. D. Lewis, filed January 9, 1957 now U.S. Patent 2,936,337 issued May 10, 1960.

Figure 3:
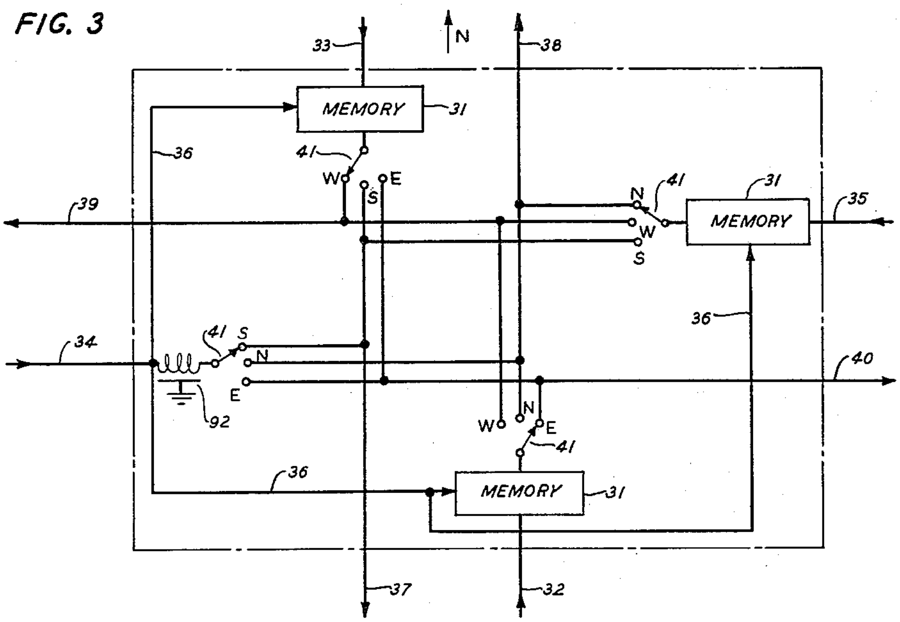
FIG. 3 shows the arrangement of the memory units of the present invention at a typical rerouting or switching center.

FIG. 3 illustrates schematically the position of memory units 31 with respect to the switching circuitry of centers 28 and 29. As shown, incoming transmission media comprising northerly directed line 32, southerly directed line 33, easterly directed line 34, and westerly directed line 35 converge at the center, while associated outgoing lines, to wit: southerly directed line 37, northerly directed line 38, westerly directed line 39, and easterly directed line 40 diverge from the center. In the figure, signals propagating on incoming easterly directed line 34 are used as reference, and are applied by conductors 36 to control memory units 31. Digits arriving at the center on lines 32, 33 and 35, are respectively applied to individual memory units 31. The memory units align digits so that they may be directly inserted, by means of selecting switches 41, into selected time slots of any of the outgoing lines 37 through 40. If, for example, alignment occurs as in waveform *e* of FIG. 2, digits on any line may be directly inserted into any other line without losing their identity with respect to the multiplex frame in which they were originally included. A delay element 92 is inserted in reference line 34 to compensate for small finite delays accompanying the operation of memory units 31.

Figure 4:
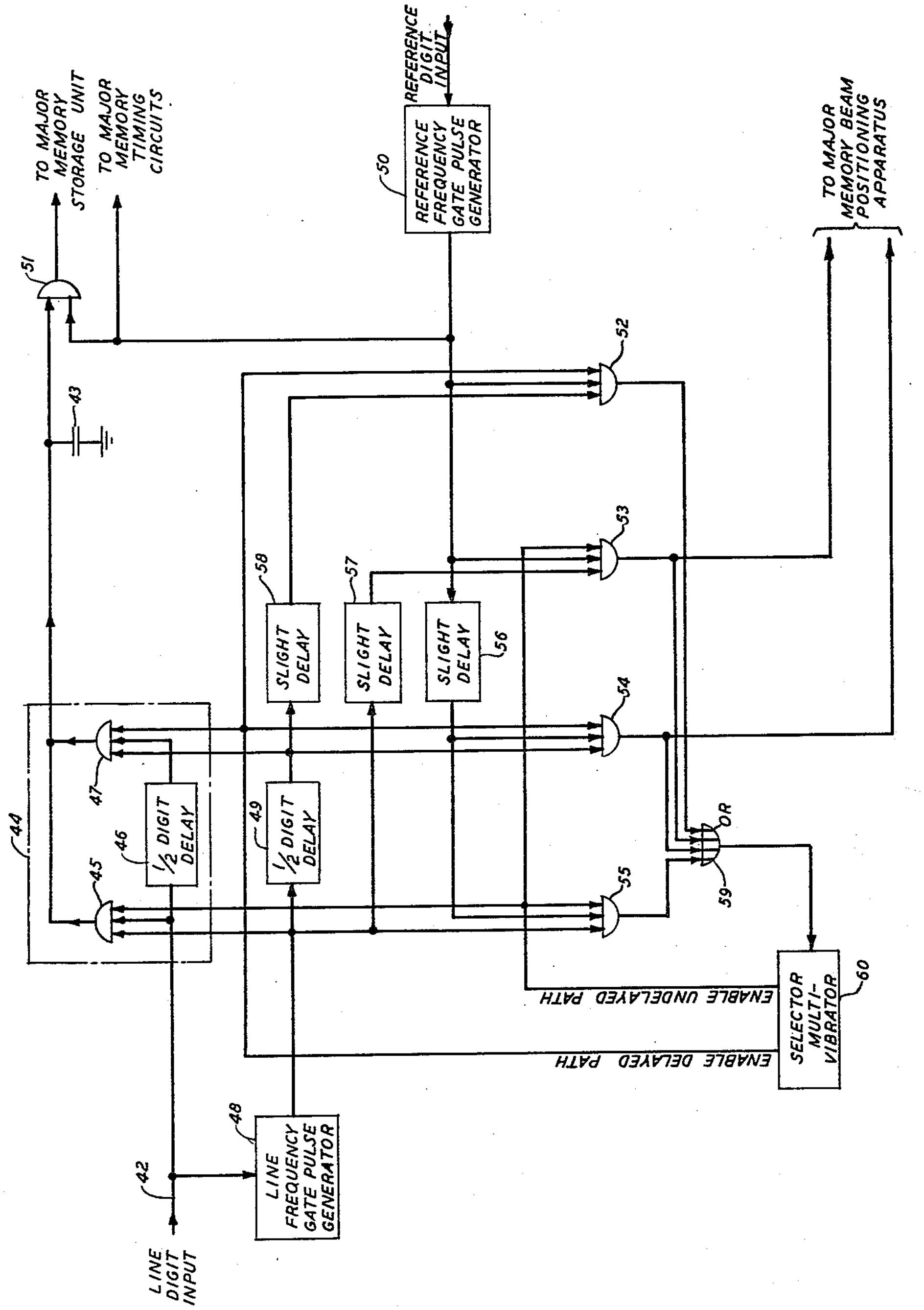
FIG. 4 depicts one illustrative embodiment of a minor memory circuit constructed in accordance with the principles of the invention.

Illustrated in FIG. 4 is one embodiment of a minor memory circuit, arranged in accordance with the principles of the invention, for transferring digit samples to a major memory circuit in synchronism with pulses appearing on a reference line. As shown in the drawing a transmission line 42 is coupled to a storage capacitor 43 through a switching circuit 44. Switching circuit 44 transfers energy to capacitor 43 through one of two mutually exclusive paths, a first of these paths including coincident circuit 45, and a second including serially connected half-digit delay element 46 and coincident circuit 47. Coincidence circuits 45 and 47, commonly known as AND gates, translate a signal applied to a particular input terminal upon coincident energization of all input terminals. Also connected to transmission medium 42 is a line frequency gate pulse generator 48 for producing narrow sampling pulses, such as illustrated in the waveforms of FIG. 2, which occur substantially at the midpoints of incoming digits. Pulse or timing generators such as those shown generally at 48 are well known in the art and are, for example, described in an article by W. R. Bennett entitled "Statistics of Regenerative Digital Transmission" published in the November 1958 issue of the Bell System Technical Journal at page 1501. The output of pulse generator 48 is directly coupled to an enabling terminal of coincident circuit 45 and coupled to an enabling terminal of coincident circuit 47 through a half-digit delay element 49.

Connected to the reference line is a reference frequency gate pulse generator 50, structurally similar to pulse generator 48, which produces narrow pulses situated at the midpoints of digits propagating through the reference line. The output of pulse generator 50 is coupled to a first input terminal of coincident circuit 51, which has its second input terminal energized by storage capacitor 43. The output of pulse generator 50 is also coupled directly to a first pair of coincident circuits 52 and 53, and through delay circuit 56, to a second pair of coincidence circuits 54 and 55. The output of pulse generator 48 is also coupled to input terminals of coincident circuits 52 through 55, the coupling links being a wire to coincident circuit 55, a half-digit delay element 49 to coincident circuit 54, a slight-delay element 57 to coincident circuit 53, and serially connected half-digit delay element 49 and slight-delay element 58 to coincident circuit 52. The delay times of delay elements 56, 57 and 58 are relatively small in comparison to half-digit delay elements 46 and 49.

The outputs of coincident circuits 52 through 55 are coupled through an OR gate 59 to a "selector" bistable multivibrator 60. Selector 60 includes a single input terminal and two output terminals upon which oppositely phased pulse trains appear, and is adapted, through any of a number of well-known techniques, to change state upon the occurrence of each pulse from OR gate 59. Signals from one of the output terminals of selector 60 are applied to enabling terminals of coincident circuits 45, 53 and 55, while signals from the other are applied to enabling terminals of coincident circuits 47, 52 and 54.

In operation, the minor memory circuit functions to transfer digit samples to the major memory circuit in synchronism with the occurrence reference pulses in three distinct situations, to wit: where the samples occur at the same rate but are displaced in time from the reference pulses, and where the samples occur either at a higher, or a lower rate than the reference pulses. The waveforms of FIG. 2 characterize these three situations and, therefore, will again be discussed in order to facilitate a description of the operating principles of the circuit illustrated in FIG. 4. The first of the above-mentioned situations is pictorially described in FIG. 2 by waveforms *a* and *c*. As depicted, the sampling pulses of waveform *a* are reference pulses to which samples of digits of waveform *c* are to be aligned. Digit 70 of waveform *c* is applied simultaneously by incoming line 42 to pulse generator 48 and coincidence circuit 45. As arranged, when the reference pulses and the digit samples are substantially noncoincident, multivibrator 60 resides in a state whereby the undelayed path of switching circuit 44 is operative, that is to say, coincidence circuit 45 is enabled while conversely, the delayed path including half-cycle delay element 46 and coincidence circuit 47 is disabled. Likewise, with selector 60 in the aforementioned state, coincidence circuits 53 and 55 are enabled, while coincidence circuits 52 and 54 are disabled.

At the midpoint of digit 70 a sampling pulse is applied by pulse generator 48 to coincidence circuit 45, thereby permitting a sample of digit 70 to be transferred to and stored in capacitor 43. Approximately one-half period thereafter, as is seen from waveform *a*, a reference pulse is generated by pulse generator 50 which, in application to coincidence 51, allows the stored sample to be transferred to the major memory circuit associated with line 42. This reference pulse is instantaneously applied to coincidence circuits 52 and 53 and, after a slight delay, to coincidence circuits 54 and 55. Coincidence circuits 52 through 55, along with the circuitry by which they are energized, comprise a phase or coincidence detector which emits a signal to reverse selector 60 in accordance with the phase of the digits of waveform *c* with respect to those of waveform *a*. Since circuits 52 and 54 are disabled by selector 60, they are precluded at this time from emitting signals. Slight delay element 56 in tending to further separate the reference pulse from digit 70 sampling pulse, disables circuit 55 from producing a signal at the time. Although delay element 57 tends to bring the two aforementioned pulses into alignment, its delay is insufficient to result in coincidence. Thus, no signal is presented to OR gate 59 to reverse selector 60. Upon the occurrence of subsequent digits of waveforms *a* and *c* the same operation is repeated, there being no relative motion between the digit trains.

The second of the situations is illustrated in FIG. 2 by the samples of waveform *a*, as reference pulses, in conjunction with the digit samples of waveform *d*. Since there are a greater number of samples per unit time than there are reference pulses, it is evident that for alignment to occur, some of the samples must be deleted. Digit 90, appearing on line 42, is sampled at its midpoint by a pulse from generator 48 and stored in capacitor 43. With digit 90 and reference digit 1 substantially non-aligned, selector 60, as in the previous situation, resides in a state enabling coincidence circuit 45. Approximately one-half period after the occurrence of the digit 90 sampling pulse, the reference pulse derived from digit 1 is applied to coincidence circuit 51, thereby transferring the stored sample to the major memory. Because of the time separation of the sample and the reference pulse, no signal is emitted by any of the coincidence circuits 52 through 55 to reverse selector 60. The same operation is repeated with subsequent digit samples through the alignment of the sample of digit 93 with the reference pulse of digit 4.

Reference pulse 4 is applied to delay element 56 and, after a slight delay, to coincidence circuit 55. The slight delay of element 56 is sufficient to establish coincidence between the reference pulse derived from digit 4 and the sample of digit 94, and, since coincidence circuit 55 is at this time enabled, a signal is emitted to reverse selector 60. Accordingly, coincidence circuits 47, 52 and 54, are enabled, and coincidence circuits 45, 53 and 55, are disabled.

To better illustrate the circuits operation, reference is made to the waveforms of FIG. 5 in which waveforms *a* and *b* are the sampling pulses shown in waveforms *a* and *d*, respectively, of FIG. 2, and waveform *c* comprises certain of the sampling pulses of waveform *b* which are delayed one-half period. As illustrated by waveform *b*, samples of digits 90 through 93 are individually stored in capacitor 43, and successively transferred to the major memory circuit by reference pulses 1 through 4, respectively. Slightly after the occurrence of reference pulse 4, the reversal of selector 60, affected by the coincidence of slightly delayed reference pulse 4 and digit sample 94, enables the delayed path of switching circuit 44. By virtue of half-period delay elements 46 and 49, digits 94 through 97 are sampled, and their samples stored one-half period after their time of arrival via line 42. This half-period delay is illustrated in waveform *c* of FIG. 5 by sampling pulses 94*a* through 97*a*.

After sample 97*a* is transferred to the major memory, slight delay element 56 establishes coincidence between sampling pulse 98*a* and reference pulse 8. Since coincidence circuit 54 is now enabled, a signal is transferred through OR gate 59 to reverse selector 60. By this means coincidence circuit 47 is disabled, thereby precluding the sampling of digit 98 by coincidence circuit 47. The sample of digit 98 is, therefore, deleted from those transferred to the major memory, and the next digit to be sampled by the now enabled undelayed path of switching circuit 44, and its sample stored, is 99.

The third of the situations is characterized in FIG. 2 by waveform *a*, as reference, in conjunction with waveform *b*. Since there are fewer sampling pulses than reference pulses, duplicate samples are added to permit complete alignment. The operation of the minor memory in this situation is best illustrated by FIG. 6, in which waveforms *a* and *b* are similar to waveforms *a* and *b*, respectively, of FIG. 2 and waveform *c* illustrates some of the sampling pulses of waveform *b* delayed one-half period. Samples of incoming digits 40 through 42 are stored in capacitor 43, and, upon the occurrence of reference pulses 1 through 3, are transferred to the major memory circuit. Delay element 57 establishes coincidence between sample 42 and reference pulse 3. Since coincidence circuit 53 is enabled at this time by selector 60, a signal is transferred through OR gate 59 to reverse the selector. With the selector reversed, coincidence circuit 47 is enabled, thereby allowing the resampling of digit 42 by reference pulse 3 when they respectively emerge from delay elements 46 and 49. The resample of digit 42 is shown in waveform *c* of FIG. 6 as 42*a*, which pulse is transferred to the major memory circuit upon the occurrence of reference pulse 4. By this means a duplicate sample is added to those transferred to the major memory.

The delayed path of switching circuit 44 remains enabled through the occurrence of reference pulse 6 which serves to transfer sample 44a to the major memory circuit. Upon the occurrence of reference pulse 6, coincidence is established at the now enabled gate 52 between that reference pulse and the sampling pulse of digit 44a. A signal is then transferred through OR gate 59 which reverses the selector, thereby reenabling the undelayed path of switching circuit 44. Digit samples 45 and 46 are thereafter transferred through coincidence circuit 45 to storage capacitor 53, and, upon the occurrence of reference pulses 7 and 8, respectively, are transferred to the major memory. The cycle then repeats itself, and duplicate samples are added to those transferred to the major memory each time the reference train of pulses advances a full-digit period with respect to digits arriving on an incoming line.

Although distortion added to a message by virtue of occasional sample duplication or deletion is generally imperceptible, it can, if desired, be reduced to an even lesser degree by the addition of circuitry to allow duplication or deletion of only the least significant digit in a code group. Such operation is accomplished, for example, by use of a conventional divider circuit which emits for a given number of input pulses a single output pulse, in this case the ratio being equal to the number of digits in a code group. Input pulses to the divider consist of reference pulses, and the divider is originally set so that its output pulse periodically occurs only on the least significant digit of each code group. If the signals emitted from OR gate 59 operative to reverse selector 60 are made dependent upon the concurrence of pulses from the divider, by means of an AND gate for example, sample duplication or deletion will occur only on the least significant digit of a pulse group.

Figure 7:
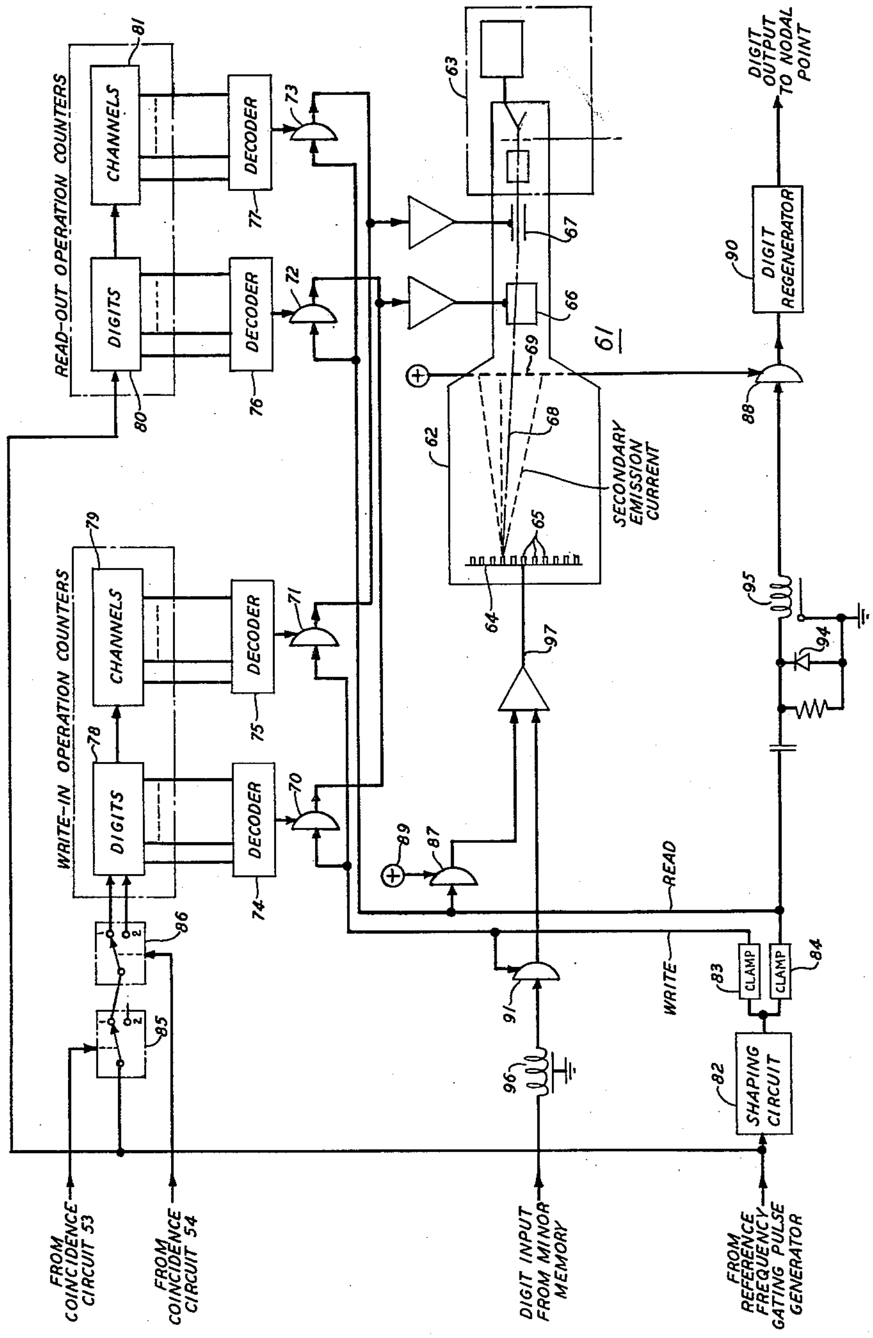
FIG. 7 depicts an illustrative embodiment of a major memory circuit in accordance with the invention.

One illustrative embodiment of a major memory circuit constructed in accordance with the principles of the invention is shown schematically in FIG. 7. As illustrated, the circuit includes a cathode-ray storage device 61 having electron gun apparatus 63 and target structure 64 positioned at opposite ends of an evacuated enclosing envelope 62. In one form, the target structure comprises a metallic plate having elemental areas of insulated material 65 embossed in a mosaic pattern upon its surface. Situated within envelope 62 in proximity with electron gun apparatus 63 are deflection elements 66 and 67 operative to direct an electron beam 68 toward selected ones of insulating areas 65. A biased grid structure 69 for collecting secondary electrons emitted from insulating areas 65 during the read-out operation of storage device 61 is disposed between the deflection elements and target structure. A lead 97 connected to the metallic surface of target structure 64 applies both read-out and write-in potentials to the storage device. Cathode-ray storage devices, such as that briefly described above, are well known in the art, an illustrative example being disclosed in U.S. Patent 2,726,328 granted on December 6, 1955 to A. M. Clogston. Such devices are readily adaptable to read-out stored information on a nondestructive basis, while writing-in information, on the other hand, on a destructive basis. It is to be understood, however, that numerous other storage devices are encompassed within the spirit and scope of the invention, reference to cathode-ray type devices such as that disclosed in the aforementioned Clogston patent being in no way restrictive.

Deflection potentials suitable to properly position beam 68 are generated by a set of binary counters 78 through 81 which are individually connected to digital-to-analog decoders 74 through 77, respectively. The output potentials of decoders 74 through 77 are coupled to the deflection elements of storage device 61 through gates 70 through 73, respectively. One pair of counters 78 and 79 are designated write-in operation counters and, as their name implies, function to properly position beam 68 during the write-in or storage operation. Similarly, the remaining pair of counters 80 and 81 are denominated read operation counters and, correspondingly, position beam 68 during the read-out or sensing operation. Target structure 64 is described for convenience, but not restriction, as being rectangular in shape with insulating elements 65 arranged in mutually perpendicular rows and columns. In this configuration each row corresponds to a different message channel, while each column represents a different digit within a channel. Accordingly, counters 78 and 80 by connection through gates 70 and 72 to horizontal deflection elements 66, select the row, and counters 79 and 88, by connection through gates 71 and 73 to vertical deflection elements 77, the columns, in which beam 68 is positioned during the write and read intervals, respectively. Counters 78 through 81 in one arrangement of the invention are of the conventional binary type which periodically reset at predetermined counts. Digit counters 78 and 80 reset at a count corresponding to the number of digits in a channel, while channel counters 79 and 81 reset at a count corresponding to the number of channels in a multiplex frame. Although in the foregoing illustration binary counter-decoder arrangements are described producing suitable waveforms with which to selectively position beam 68, it is evident that any number of well-known similarly functioning devices may alternatively be utilized without departing from the scope of the invention. If, for example, samples are to be read-out in some predetermined non-sequential order, programmed deflection potentials may be derived by apparatus similar to that disclosed in an article by W. H. Highleyman and L. A. Kamentsky entitled "A Generalized Scanner for Pattern—and—Character Recognition Studies" appearing in the March 1959 issue of the Proceedings of the Western Joint Computer Conference at page 291.

Timing for the read-out and write-in operations of storage device 61 is controlled by minor memory reference pulse generator 50. Reference pulses from generator 50 are applied to shaping circuit 82 which substantially produces square waves having a frequency equal to the rate of applied reference pulses. Circuit 82, in one of its many possible forms, comprises a tuned filter, a high gain amplifier, and a bipolar clipping arrangement, tandemly connected in that order. The output of shaping circuit 82 is connected to oppositely poled clamping arrangements 83 and 84, which produce individual square wave 180 degrees out of phase with each other. Signals from clamp 83 are coupled to control the write-in operation of storage device 61, while signals from clamp 84, on the other hand, control the read-out operation.

Reference pulses from generator 50, in addition to energizing shaping circuit 82, are coupled directly to the input of digit counter 80, and through switches 85 and 86, to the input of digit counter 78. Switches 85 and 86 are each characterized in the figure as two position switches having their armatures controlled by signals emitted from coincidence circuits 53 and 54, respectively. Switches 85 and 86 either preclude the advancement of counter 78 or allow the counter to advance one or two counts per reference pulse. When the armature of switch 85 resides in position 1, a reference pulse will advance counter 78 either one or two counts according to the position of the armature of switch 86. When the armature resides at open terminal 2 of switch 85, no pulses are applied to responsively advance counter 78. When the armature of switch 86 resides in its position 1, counter 78 advances one count for each applied pulse. When the armature resides at position 2, on the other hand, an applied reference pulse advances the counter two counts. Arrangements for selectively advancing a counter either one or two counts in response to the application of only one pulse are well known in the art, and may, for example, comprise a circuit for selectively applying an input signal to either the second or the first counter stage. Counters 79 and 81 are advanced by signals derived from the reset connections of counters 78 and 80, respectively.

In operation, the major memory circuit performs two distinct functions during each time slot, namely writing-in (storing) digit samples transferred from a minor memory, and reading-out previously stored samples. These functions occur during different halves of a time slot, reading occupying the first half, while writing, the second. Time slot division of major memory apparatus is accomplished by gating circuitry under the control of timing signals emitted by oppositely poled clamps 83 and 84. To obtain suitable timing signals, reference pulses are applied to shaping circuit 82, and in response, a tuned filter included in the shaping circuit generates sine wave oscillations having a frequency equal to the rate of applied pulses. This wave, after amplification and bipolar clipping, emerges substantially as a square wave having each of its half cycles equal to half of a time slot. The square wave is simultaneously applied to clamps 83 and 84 which respectively produce two trains of half-digit width pulses 180 degrees out of phase with each other. The train having its pulses occur during the first half of each time slot is the read-out operation timing wave, while the train having its pulses occur during the last half is the write-in operation timing wave. The aforementioned timing waves, and the signals from which they are derived, are illustrated by FIG. 8 in which waveform *a* is identical to waveform *a* of FIG. 2, waveform *b* illustrates the substantially square wave emitted by shaping circuit 82, and waveforms *c* and *d*, respectively, are the write-in and read-out control pulses from clamps 83 and 84.

For the read-out operation to proceed according to the principles of the invention, apparatus (not shown) is provided to identify a particular digit arriving at a nodal point via a reference medium, and to set the read-out counters to direct beam 68 at the insulating area 65 upon which is stored the sample to be read out at that particular time. This procedure, known as framing, need only be performed once at each major memory during the systems operation, however, in practice it is generally performed once during each multiplex frame. Any of a number of well-known framing methods may be utilized in practicing the invention, an illustrative example being disclosed in an article by J. M. Manley entitled "Synchronization for the PCM Receiver" appearing in the February 1949 issue of the Bell Laboratories Record at page 62. For convenience of illustration, the major memory circuit is described as aligning digits on different lines in corresponding orders, or stated differently, the time slot of an aligned digit on any line will be the same as that of an aligned digit on any other line at the same instant of time. It is to be understood, however, that the major memory may align digits on different lines in many predetermined orders with respect to each other without departing from the principles of the invention.

The first function to occur during any time slot is the read-out operation. With joint reference to FIGS. 7 and 8, during the first half of the digit 1 time slot, read operation timing pulse 1R is applied simultaneously to gates 72, 73 and 87. Due to the framing operation, when gates 72 and 73 are enabled deflection voltages are applied to deflection elements 66 and 67 which are suitable to direct beam 68 toward the elemental area 65 corresponding to digit 1. With gate 87 enabled, battery 89 applies a read bias to the conducting surface of target structure 64. As beam 68 bombards the insulating area corresponding to digit 1, secondary emission electrons collect on grid 64 to supply a charge in accordance with the value of the stored sample. The value of the sample, as indicated by the value of charge on grid 64, is applied through gate 88 to digit regenerator 90. Digit regenerator 90, which may, for example, be a conventional Schmitt trigger circuit, produces pulses which have widths equal to digits. Enabling signals for gate 88 are derived by differentiating read pulses of waveform *d* and detecting only the positive impulses with diode 94. A slight delay in applying an enabling pulse to gate 88 is provided by delay element 95 in order to afford beam 68 sufficient time to attain proper direction. The delay in digit regeneration caused by delay element 95, plus any delay inherent in regenerator 90, is compensated at a nodal point by a delay element such as 92 (FIG. 3) so that digits arrive at their respective transfer points, switch 41, in time alignment.

After the termination of the read-out operation, a write-in operation is initiated by timing pulse 1W which is simultaneously applied to gates 70, 71, and 91. Also at this time, reference pulse 1 is applied to digit counters 78 and 80 to advance each a single digit. With gates 70 and 71 enabled, beam 68 is directed toward the elemental area 65 corresponding to the sample succeeding the one last stored. After a delay through element 96, sufficient to allow beam 68 to attain proper direction, the digit sample from the minor memory circuit is transferred through gate 91 and stored on the elemental area 65 at which beam 69 is directed. The storage device 61 is now ready for the next read-out operation initiated by timing pulse 2R.

Since each stored digit sample is assigned its own insulating area 65, switches 85 and 86 are provided to compensate for the duplication or deletion of digit samples by the minor memory circuit. In the case of sample deletion, write-in operation digit counter 78 advances two counts in response to the application of one reference pulse. In FIG. 5, for example, sample 98 is deleted, sample 99 being transferred to the major memory in its place. Thus, after digit sample 97 is stored, counter 78 must be advanced two counts in order to properly direct beam 68 to the insulating area corresponding to sample 99. Since a signal is emitted by coincidence circuit 54 (FIG. 4) each time a sample is deleted, this signal is utilized to actuate the armature of switch 86 to position 2 for the duration of that particular time slot. In the case of sample duplication, on the other hand, write-in operation digit counter 78 does not advance a count in response to the application of a reference pulse. As depicted in FIG. 6, for example, sample 42*a*, rather than 43 which has not yet arrived, is transferred by reference pulse 4. Thus, after sample 42 is stored counter 78 should not be immediately advanced in order to avoid having sample 42*a* stored on the insulating area 65 corresponding to sample 43. Since coincidence circuit 53 emits a signal when a spurious sample is inserted, that signal is utilized to actuate the armature of switch 85 to position 2 for the duration of time slot corresponding to the duplicate sample.

Due to the nature of a major memory circuit, the possibility arises that particular stored samples will, in certain situations, be read-out twice, in certain other situations, not be read out at all. Consider, for example, a situation in which the digits on a reference line occur at a greater rate than digits propagating through one of the other converging lines, that is to say, digits are being read-out of the major memory faster than samples are being stored. If, for example, the storage capacity of a major memory circuit is one multiplex frame, the digits of one multiplex frame will be repeated each time the reference train of digits, figuratively speaking, advances one multiplex frame with respect to the digits on the line in which the major memory circuit is connected. On the other hand, consider a situation in which digits on a reference line occur at a lesser rate than digits propagating in one of the other converging lines, or, stated differently, digits are stored faster than they are read-out. If, as previously, the storage capacity of the major memory circuits is one multiplex frame, the digits of one multiplex frame will be deleted each time the train of digits on the line in which the major memory is connected advance one multiplex frame with respect to the train on the reference line. The repetition or deletion of a full frame of digits occurs, in a practical situation, at a sufficiently low rate to render substantially imperceptible any distortion added by this process to the information wave.

While only one illustrative embodiment of the invention has been described herein, it should be apparent to one skilled in the art that numerous other arrangements may be devised without departing from the spirit and scope of the invention.

What is claimed is:

1. A multiplex communication system including first and second multiplex terminals, a first transmission medium for translating electrical signals from said first terminal to said second terminal, a second transmission medium for translating electrical signals from said second terminal to said first terminal, and means disposed electrically intermediate said first and second terminals for aligning signals translated by one of said transmission media in a predetermined order with respect to signals translated by the other of said transmission media.

2. A multiplex communication system including first and second multiplex terminals, a first transmission medium for translating electrical signals from said first terminal to said second terminal, a second transmission medium for translating electrical signals from said second terminal to said first terminal, and means disposed electrically intermediate said first and second terminals for aligning signals translated by one of said transmission media with corresponding signals translated by the other of said transmission media.

3. A multiplex communication system including a first multiplex terminal, a second multiplex terminal, a first transmission medium interconnecting said first and said second multiplex terminals for translating electrical signals from said first to said second terminal, a second transmission medium interconnecting said first and second terminals for translating electrical signals from said second to said first terminal, and means disposed electrically intermediate said first and second terminals for synchronizing in predetermined orders the phase and frequency of said signals propagating at predetermined points of one of said media with the phase and frequency of said signals propagating at predetermined points of the other of said media.

4. A multiplex communication system including a first multiplex terminal, a second multiplex terminal, a first transmission medium interconnecting said first and said second multiplex terminals for translating electrical signals from said first to said second terminal, a second transmission medium interconnecting said first and second terminals for translating electrical signals from said second to said first terminal, and means disposed electrically intermediate said first and second terminals for synchronizing the phase and frequency of said signals propagating at predetermined points of one of said media with the phase and frequency of corresponding of said signals propagating at predetermined points of the other of said media.

5. A multiplex communication system including first and second multiplex terminals, means for providing a first transmission medium for translating electrical signals from said first to said second terminal, means for providing a second transmission medium for translating electrical signals from said second to said first terminal, and means disposed in one of said media electrically intermediate said terminals for adjusting the signals appearing at predetermined points of that medium to be synchronous in selectable orders with said signals at predetermined points of the other of said media.

6. A multiplex communication system including first and second multiplex terminals, means for providing a first transmission medium for translating electrical signals from said first to said second terminal, means for providing a second transmission medium for translating electrical signals from said second to said first terminal, and means disposed in one of said media electrically intermediate said terminals for adjusting the signals appearing at predetermined points of that medium to be synchronous with corresponding of said signals at predetermined points of the other of said media.

7. A multiplex communication system including first and second multiplex terminals, means for providing a first transmission path for translating electrical signals from said first to said second terminal, means for providing a second transmission path for translating electrical signals from said second to said first terminal, controllable delaying means connected in one of said paths, means energized by said electrical signals in the other of said paths for controlling said delaying means to synchronize the phase of signals associated with said first path with the phase of signals associated with said second path, and storage means associated with said delaying means for synchronizing the translation of signals in said first path in selected orders with respect to the translation of signals in said second path.

8. A multiplex communication system including first and second multiplex terminals, means for providing a first transmission path for translating electrical signals from said first to said second terminal, means for providing a second transmission path for translating electrical signals from said second to said first terminal, controllable delaying means connected in one of said paths, means energized by said electrical signals in the other of said paths for controlling said delaying means to synchronize the phase of signals associated with said first path with the phase of signals associated with said second path, and storage means associated with said delaying means for synchronizing the translation of signals in said first path with the translation of corresponding signals in said second path.

9. In a time division multiplex system a first multiplex terminal, a second multiplex terminal, a first transmission medium interconnecting said terminals for translating coded electrical signals from said first terminal to said second terminal, a second transmission medium for translating coded electrical signals from said second terminal to said first terminal, phase detecting means for producing a response representative of the difference in phase between said signals translated by said first and said second media, controllable delaying means connected in one of said media operative in accordance with said response for synchronizing the phase of the coded signals at a predetermined point of one of the media with the coded signals at a predetermined point in the other of the media, a storage device associated with said delaying means, means for sequentially storing signals delayed by said delaying means, and means for sensing in predetermined orders at least a portion of said stored signals in synchronism with signals translated by the other of said media.

10. In a time division multiplex system a first multiplex terminal, a second multiplex terminal, a first transmission medium interconnecting said terminals for translating coded electrical signals from said first terminal to said second terminal, a second transmission medium for translating coded electrical signals from said second terminal to said first terminal, phase detecting means for producing a response representative of the difference in phase between said signals translated by said first and said second media, controllable delaying means connected in one of said media operative in accordance with said response for synchronizing the phase of the coded signals at a predetermined point of one of the media with the coded signals at a predetermined point in the other of the media, a storage device associated with said delaying means, means for sequentially storing signals delayed by said delaying means, and means for sensing at least a portion of said stored signals in synchronism with corresponding signals translated by the other of said media.

11. A multiplex pulse code modulation system including first and second multiplex terminals, a first transmission medium for transferring coded pulse groups from said first to said second terminal, a second transmission medium in which coded pulse groups propagate from said second toward said first terminal, means connected in said second medium intermediate said first and second terminals for sequentially storing pulses which propagate in said second medium toward said storage means, a phase comparator for producing a signal in accordance with the difference in phase between pulses appearing at a predetermined point in said first medium and pulses entering said storage means, means under the control of said signal for retransmitting said stored pulses in phase coincidence with pulses at said predetermined point in said first medium, a storage tube, means also under the control of said signal for sequentially storing said retransmitted pulses in said storage tube, means for generating a timing wave in accordance with the frequency of pulses comprising said coded pulse groups transferred by said first transmission medium, and means under the control of said timing wave for sensing at least a portion of said stored pulses in synchronism with corresponding pulses appearing at said predetermined point of said first medium.

12. A pulse code modulation communication system including first and second multiplex terminals, a first transmission medium for transferring coded pulse groups from said first to said second terminal, a second transmission medium in which coded pulse groups propagate from said second toward said first terminal, means for deriving samples of each pulse of said pulse groups propagating in said second medium, a first storage device connected to sequentially stored said samples, a phase detector connected to said communication system for producing a response in accordance with the phase difference between pulses at a predetermined point of said first medium and pulses from which said samples are derived, means for retransmitting stored samples in synchronism with pulses at said predetermined point of said first medium, first means including in said retransmitting means under the control of said response for retransmitting a spurious sample whenever the pulses from which said samples are derived advance a pulse period with respect to the pulses at said predetermined point of said first medium, second means included in said retransmitting means under the control of said response for deleting the retransmission of a sample whenever the pulses at said predetermined point of said first medium advance a pulse period with respect to pulses from which said samples are derived, a second storage device associated with said first storage device, means for storing retransmitted samples in said second storage device, and means for sensing at least a portion of the pulses stored in said second storage device in synchronism with corresponding pulses appearing at said predetermined point of said first medium.

13. A pulse code modulation communication system including first and second multiplex terminals, a first transmission medium for transferring coded pulse groups from said first to said second terminal, a second transmission medium in which coded pulse groups propagate from said second toward said first terminal, means for deriving samples of each pulse of said pulse groups propagating in said second medium, a first storage device connected to sequentially store said samples, a phase detector connected to said communication system for producing a response in accordance with the phase difference between pulses at a predetermined point of said first medium and pulses from which said samples are derived, means for retransmitting stored samples in synchronism with pulses at said predetermined point of said first medium, first means included in said retransmitting means under the control of said response for retransmitting a duplicate one of the preceding samples whenever the pulses from which said samples are derived advance a pulse period with respect to the pulses at said predetermined point of said first medium, second means included in said retransmitting means under the control of said response for deleting the retransmission of a sample whenever the pulses at said predetermined point of said first medium advance a pulse period with respect to pulses from which said samples are derived, a second storage device associated with said first storage device, means for storing retransmitted samples in said second storage device, and means for sensing at least a portion of the pulses stored in said second storage device in synchronism with corresponding pulses appearing at said predetermined point of said first medium.

14. A pulse code modulation communication system comprising at least first and second multiplex terminals, a first transmission medium for transferring coded pulse groups from said first to said second terminal, a second transmission medium in which coded pulse groups propagate from said second towards said first terminal, a first storage device, means for selectively providing a first or a second path through which pulses propagating in said second medium are transferred to said first storage device, said second path including a delay element, a detector connected to said first and said second media for producing a response proportional to the difference in phase between pulses arriving at said paths and pulses at a predetermined point of said first medium, switching means operative in response to said detector for exclusively selecting one of said paths to transfer pulses to said first storage device, means for retransmitting pulses from said first storage device in phase synchronism with pulses appearing in said first medium at said predetermined point, a second storage device for sequentially storing said retransmitted pulses, means for generating a timing wave in accordance with pulses at said predetermined point of said first medium, and means under the control of both said timing wave and said response for sensing at least a portion of the pulses stored in said second storage device in synchronism with corresponding pulses appearing at said predetermined point of said first medium.

15. In a multiplex communication system including a plurality of stations at which groups of bidirectional transmission media converge, each of said media comprising a first medium for propagating electrical signals toward a station, and a second medium for propagating electrical signals away from a station; a combination at any of said stations comprising a source of reference waves, means for identifying said reference waves, means under the control of said reference waves for storing said signals propagating in said first media, and means for sensing said stored signals in coincidence with the occurrence at said station of corresponding reference waves.

16. In a multiplex communication system including a plurality of stations at which groups of bidirectional transmission media converge, each of said media comprising a first medium for propagating electrical signals toward a station, and a second medium for propagating electrical signals away from a station; a combination at any of said stations comprising a source of reference waves, means for identifying said reference waves, means under the control of said reference waves for storing said signals propagating in said first media, and means for selectively sensing said stored signals in coincidence with the occurrence at said station of predetermined ones of said reference waves.

17. In a time division multiplex communication system including a plurality of stations to which groups of bidirectional transmission media are connected, each of said media comprising a first medium for translating digital signals toward a station, and a second medium for translating digital signals away from a station; a combination at any of said stations comprising a source of reference digits severally corresponding to said digital signals; means for identifying said reference digits; means for storing representations of said digital signals translated by said first media in accordance with the frequency of said reference digits; and means for individually sensing said representations in a predetermined order in coincidence with the occurrence at said station of individual reference digits.

18. In a time division multiplex communication system including a plurality of stations to which groups of bidirectional transmission media are connected, each of said media comprising a first medium for translating digital signals toward a station, and a second medium for translating digital signals away from a station; a combination at any of said stations comprising a source of reference digits severally corresponding to said digital signals; means for identifying said reference digits; means for storing representations of said digital signals translated by said first media in accordance with the frequency of said reference digits; and means for individually sensing said representations in coincidence with the occurrence at said station of corresponding reference digits.

References Cited in the file of this patent

UNITED STATES PATENTS

| | | |
|---|---|---|
| 2,541,076 | Labin | Aug. 7, 1944 |
| 2,912,508 | Hughes | Nov. 10, 1959 |
| 2,917,583 | Burton | Dec. 15, 1959 |